United States Patent
Ishida et al.

(10) Patent No.: US 9,617,622 B2
(45) Date of Patent: Apr. 11, 2017

(54) HYDROGEN GAS GENERATING MEMBER AND HYDROGEN GAS PRODUCING METHOD THEREFOR

(75) Inventors: Kiyohito Ishida, Sendai (JP); Ryosuke Kainuma, Natori (JP); Ikuo Ohnuma, Shibata-gun (JP); Toshihiro Omori, Sendai (JP); Yoshikazu Takaku, Sendai (JP); Takehito Hagisawa, Sendai (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1012 days.

(21) Appl. No.: 12/674,323

(22) PCT Filed: Aug. 11, 2008

(86) PCT No.: PCT/JP2008/002191
§ 371 (c)(1), (2), (4) Date: Feb. 19, 2010

(87) PCT Pub. No.: WO2009/028143
PCT Pub. Date: Mar. 5, 2009

(65) Prior Publication Data
US 2012/0107228 A1      May 3, 2012

(30) Foreign Application Priority Data

Aug. 29, 2007 (JP) .................. 2007-222477

(51) Int. Cl.
C22C 21/00      (2006.01)
C22C 12/00      (2006.01)
(Continued)

(52) U.S. Cl.
CPC .............. *C22C 12/00* (2013.01); *B22F 9/04* (2013.01); *C01B 3/08* (2013.01); *C22C 13/00* (2013.01);
(Continued)

(58) Field of Classification Search
CPC ......... C22C 12/00; C22C 13/00; C22C 21/00; C22C 30/00
(Continued)

(56) References Cited

U.S. PATENT DOCUMENTS 4,358,291 A    11/1982  Cuomo et al.
4,745,204 A     5/1988  Cuomo et al.
(Continued)

FOREIGN PATENT DOCUMENTS

JP      1-23543      5/1989
JP      2001-31401   2/2001
(Continued)

OTHER PUBLICATIONS

Kravchenko, O.V., et al. (2005). "Activation of aluminum metal and its reaction with water," *Journal of Alloys and Compounds* 397:58-62.
(Continued)

*Primary Examiner* — Brian Walck
(74) *Attorney, Agent, or Firm* — Morrison & Foerster LLP (57) ABSTRACT

A hydrogen gas generating member includes a metal alloy having dispersed aluminum. The metal alloy includes an Al—X alloy, where X is Sn: 10.1 to 99.5% by mass, Bi: 30.1 to 99.5% by mass, In: 10.1 to 99.5% by mass, Sn +Bi: 20.1 to 99.5% by mass, Sn +In: to 10 to 99.5% by mass, Bi+In: 20.1 to 99.5% by mass, or Sn+Bi+In: 20 to 99.5% by mass. Hydrogen gas is generated by bringing the hydrogen gas generating member into contact with water.

6 Claims, 4 Drawing Sheets

(51) Int. Cl.
*C22C 13/00* (2006.01)
*C22C 30/00* (2006.01)
*B22F 9/04* (2006.01)
*C01B 3/08* (2006.01)
*C22C 30/04* (2006.01)

(52) U.S. Cl.
CPC .............. *C22C 21/00* (2013.01); *C22C 30/04* (2013.01); *Y02E 60/36* (2013.01)

(58) Field of Classification Search
USPC ......... 148/437–440, 442; 420/528–555, 558, 420/562, 577, 580, 589; 423/657–658
See application file for complete search history.

(56) References Cited

U.S. PATENT DOCUMENTS

| | | | | |
|---|---|---|---|---|
| 4,752,463 | A | * | 6/1988 | Nagira et al. ................. 423/657 |
| 2001/0046113 | A1 | * | 11/2001 | Schmidt ........................ 361/508 |

FOREIGN PATENT DOCUMENTS

| | | |
|---|---|---|
| JP | 2002-161325 | 6/2002 |
| JP | 2003-12301 | 1/2003 |
| JP | 2004-123517 | 4/2004 |
| JP | 2006-45004 | 2/2006 |

OTHER PUBLICATIONS

Fan, M-Q., et al. (2007). "Studies on hydrogen generation characteristics of hydrolysis of the ball milling Al-based materials in pure water," *International Journal of Hydrogen Energy* 32:2809-2815.
International Search Report mailed Sep. 2, 2008, directed to counterpart International Application No. PCT/JP2008/002191; 4 pages.
IPRP and Written Opinion mailed Sep. 2, 2008 directed to counterpart International Application No. PCT/JP2008/002191; 12 pages.

* cited by examiner

HYDROGEN GAS GENERATING MEMBER AND HYDROGEN GAS PRODUCING METHOD THEREFOR

REFERENCE TO RELATED APPLICATIONS

This application is a national stage application under 35 USC 371 of International Application No. PCT/JP2008/002191, filed Aug. 11, 2008, which claims priority from Japanese Patent Application No. 2007-222477, filed Aug. 29, 2007, the contents of which prior applications are incorporated herein by reference.

FIELD OF THE INVENTION

The present invention relates to a hydrogen gas generating member which produces hydrogen gas to be used as a fuel for motors and fuel cells or a raw material for chemical industries using the reaction of a hydroxide forming metal typified by Al with water and its process for producing hydrogen gas.

BACKGROUND OF THE INVENTION

Hydrogen gas has been conventionally produced by electrolysis of water ($H_2O \rightarrow H_2 + 1/2O_2$) or steam reforming of hydrocarbon ($CH_4 + H_2O \rightarrow 3H_2 + CO$). However, when the electrolysis method is used, the energy efficiency is low. When the steam reforming process is used, there are problems such as a large burden on the facility and disposal of by-products. Thus, a process for producing hydrogen by reaction of metal and water has been examined.

Typical examples of the metal to be used for hydrogen production include Al and an Al alloy. For example, in Patent documents 1, 2, and 4, hydrogen gas is generated and trapped by the steps of immersing Al in Ga with a melting point of 30° C. or less or a Ga—In alloy melt, removing a surface oxide film, exposing an active surface, and contact-reacting Al with water ($Al + 3H_2O \rightarrow Al(OH)_3 + 1.5H_2$). Further, a method including the steps of cutting and processing an Al alloy immersed in water and exposing a fresh active surface (Patent document 3), friction and dynamic fracture associated with friction (Patent document 5), thermal shock by rapid heating and quenching (Patent document 6) are known.

When the generation of hydrogen gas is dependant on the reaction of the active surface of the Al alloy and water, the hydrogen gas yield is influenced by the size of the active surface. It is said that the bulk of the Al alloy does not contribute to a hydrogen gas generation reaction. Since the size of the bulk is overwhelmingly larger than that of the active surface, the hydrogen gas yield is significantly lower than the consumption of the Al alloy. It may remain within several percent of a theoretical value of 1.3 l/g·Al which is calculated from a reaction formula of $Al + 3H_2O \rightarrow Al(OH)_3 + 1.5H_2$.

Further, it is reported that hydrogen gas is generated by contact-reacting metals having a low melting point, such as Ga, In, Sn, or Zn and the alloyed Al with water (Nonpatent document 1). From the viewpoint that the hydrogen gas generation reaction is occurred by bringing dopants such as Ga, In, Sn, or Zn and the alloyed Al into contact with water, the process is advantageous as compared to a method depending on the reaction of an active surface which is newly formed by cutting and frictioning the surface of the Al alloy with water. However, the alloyed Al alloy contains expensive metals such as Ga and In and thus it is not suitable from a cost standpoint.

Further, it is reported that the hydrogen gas generation reaction is induced by bringing alloy powder produced by adding 0 to 30% by weight of Bi to Al by the mechanical alloying process using a ball mill into contact with water (Nonpatent document 2).

Patent document 1: U.S. Pat. No. 4358291
Patent document 2: U.S. Pat. No. 4745204
Patent document 3: Japanese Patent Application Laid-Open (JP-A) No. 2001-31401
Patent document 4: JP-A No. 2003-12301
Patent document 5: JP-A No. 2004-123517
Patent document 6: JP-A No. 2006-45004
Nonpatent document 1: O. V Kravchenko et al., Journal of Alloys and Compounds 397(2005). pp. 58-62
Nonpatent document2: M-Q. Fan et al., International Journal of Hydrogen Energy, Corrected Proof, Available online 12 Feb. 2007

SUMMARY OF THE INVENTION

The fact that the hydrogen gas yield is changed by the water temperature in this case is described in Patent document 6 and Nonpatent document 1. From an economical point of view, it goes without saying that it is desirable to obtain a stable hydrogen yield when the water temperature is room temperature (from 5 to 40° C.).

The present inventors have investigated and examined various effects caused by alloying of dopant. As the result, they have found that, surprisingly, when the alloyed Al alloy is subjected to a rolling treatment or a powdering treatment, the hydrogen gas generation reaction is proceeded safely and efficiently without expensive Ga.

Thus, an objective of the present invention is to provide a hydrogen gas generating member which safely promotes the hydrogen gas generation reaction by performing the rolling treatment or the powdering treatment and bringing into contact with water based on the finding.

Further, the objective of the present invention is to provide a process for producing hydrogen gas which includes a step of performing the hydrogen gas generation reaction by bringing into contact with water using the hydrogen gas generating member.

In order to solve the above-described problems, according to the present invention, there is provided a hydrogen gas generating member including a texture in which Al is finely dispersed in a metal matrix, where hydrogen gas is generated by bringing the hydrogen gas generating member into contact with water.

According to the present invention, the hydrogen gas generating member is separated into two-liquid phases having mutually different compositions in a liquid phase state and it is separated into two-liquid phases in a solid phase state.

According to the present invention, the hydrogen gas generating member is an Al—X alloy and X is at least one selected from Sn, Bi, and In.

According to the present invention, the hydrogen gas generating member is an Al—X alloy and X is selected from Sn: 10.1 to 99.5% (mass percent: hereinafter on the basis of mass percent), Bi: 30.1 to 99.5%, In: 10.1 to 99.5%, Sn+Bi: 20.1 to 99.5%, Sn+In: 10 to 99.5%, Bi+In: 20.1 to 99.5%, and Sn+Bi+In: 20 to 99.5%.

According to the hydrogen gas generating member of the present invention, the Al—X alloy further includes Y and Y is at least one selected from Pb: 0.01 to 20%, Zn: 0.01 to 30%, Si: 0.01 to 20%, Cd: 0.01 to 20%, Cu: 0.01 to 20%, Fe: 0.01 to 5%, Ga: 0.01 to 30%, Ge: 0.01 to 30%, Hg: 0.01 to 20%, Mg: 0.01 to 20%, Ni: 0.01 to 5%, S: 0.01 to 5%, and Mn: 0.01 to 5%, the content is within the range of 60% even when a plurality of elements are contained, and the relation of X and Y is defined by 2X>Y.

According to the present invention, the hydrogen gas generating member is rolled and processed.

According to the present invention, the hydrogen gas generating member is powdered.

A process for producing hydrogen gas includes a step of bringing the hydrogen gas generating member according to any one described above into contact with water to generate hydrogen gas.

According to the means to solve the problems, when the hydrogen gas generating member of the present invention is used, the hydrogen gas generation reaction may be produced with inexpensive components.

In addition, the hydrogen gas generation reaction may be safely produced by bringing into contact with water.

Further, the process for producing hydrogen gas of the present invention has a simple structure and may allow the hydrogen gas generation reaction to produce safely.

BRIEF DESCRIPTION OF THE DRAWINGS

FIG. 3 is an SEM photograph showing the cross section of the hydrogen gas generating member containing Al, Sn, and In.

DETAILED DESCRIPTION OF THE INVENTION

Hereinafter, the best mode for carrying out the invention will be described based on the drawings. In this regard, it is easy for a so-called person skilled in the art to make other embodiments by using variations and modifications of the present invention in the claims. These modifications and variations are intended to fall within the scope of the claims, but do not constitute a limitation of the claims.

The hydrogen gas generating member of the present invention includes the texture in which Al is finely dispersed in the metal matrix, where hydrogen gas is generated by bringing the hydrogen gas generating member into contact with water.

In Al in which a clean surface is exposed, it is known that hydrogen is generated while Al is reacted with water to be converted to $Al(OH)_3$. Similarly, it is known that when a high energy light having a short wavelength such as sunlight is given in the action, water is decomposed to generate hydrogen. The hydrogen gas generating member of the present invention generates hydrogen using a successive hydrogen generation mechanism in which hydrogen is generated while Al which is finely dispersed in the metal matrix is reacted with water to be converted to $Al(OH)_3$, water permeates into a part where Al disappeared, and Al in the metal matrix is reacts with water. When among them, Al is dispersed in the metal matrix, the hydrogen generating capability is not significantly reduced even if the Al surface is oxidized by oxygen.

Al is formed into a fine particle size and dispersed in the metal matrix. With reference to the fine texture of Al (hereinafter simply referred to as an Al crystal grain), a crystal grain of the metal matrix and the Al crystal grain are separated into two phases in the metal matrix. The number average domain diameter of the Al crystal grain is in the range of 0.01 to 500 μm. Hydrogen generating efficiency is influenced by the presence of the Al crystal grain in the metal matrix. When the number average domain diameter of the Al crystal grain is less than 0.01 μm, the hydrogen generating efficiency is low. Thus, this is not industrially practical. When the number average domain diameter of the Al crystal grain exceeds 500 μm, oxidation becomes significant and the capability to generate hydrogen is reduced.

Further, the hydrogen gas generating member of the present invention is formed of Al containing unavoidable impurities and a metal X. The metal X is at least one selected from Sn, Bi, and In. Further, the hydrogen gas generating member of the present invention has a composition having a temperature range where the hydrogen gas generating member is separated into Al having a mutually different composition in a liquid phase state and another liquid phase and the two-liquid phase separation is present. Thus, the hydrogen gas generating member of the present invention has a metallic texture which is separated into two-liquid phases of the metal X and Al as the metal matrix.

Further, as for the content of X, X is in the range of Sn: 10.1 to 99.5%, Bi: 30.1 to 99.5%, and In: 10.1 to 99.5% based on the hydrogen gas generating member. When Sn is less than 10.1%, Bi is less than 30.1%, and In is less than 10.1% as to the content, the amount of Al is increased. This provides demerits such that the dispersed region of Al is significantly decreased. When the content exceeds 99.5%, the amount of Al is reduced. This provides demerits such that the generation of hydrogen gas is decreased. Particularly, X is preferably in the range of Sn: 20 to 95%, Si: 35 to 90%, and In: 25 to 95%. This provides merits such that hydrogen gas is efficiently generated.

Further, the total of two or three metals selected from Sn, Bi, and In as the metal X may be in the range of Sn+Bi: 20.1 to 99.5%, Sn+In: 10 to 99.5%, Bi+In: 20.1 to 99.5%, and Sn+Bi+In: 20 to 99.5%. The two-phase separation into the metal X having a mutually different composition in a liquid phase state and Al is facilitated by containing two or more metals, which makes the production of the alloy easy. When Sn+Bi and Bi+In are less than 20.1%, Sn+In is less than 10%, and Sn+Bi+In is less than 20% as for the content, the amount of Al is increased. This provides demerits such that the dispersed region of Al is significantly decreased. On the other hand, when the content exceeds 99.5%, the amount of Al is reduced. This provides demerits such that the generation of hydrogen gas is decreased. Particularly, the content is preferably in the range of Sn+Bi: 25 to 95%, Sn+In: 25 to 95%, Bi+In: 25 to 95%, and Sn+Bi+In: 25 to 95%. This provides merits such that hydrogen gas is efficiently generated.

Further, in the hydrogen gas generating member of the present invention, the Al—X alloy is made to contain Y. Y is at least one selected from Pb: 0.01 to 20%, Zn: 0.01 to 30%, Si: 0.01 to 20%, Cd: 0.01 to 20%, Cu: 0.01 to 20%, Fe: 0.01 to 5%, Ga: 0.01 to 30%, Ge: 0.01 to 30%, Hg: 0.01 to 20%, Mg: 0.01 to 20%, Ni: 0.01 to 5%, S: 0.01 to 5%, and Mn: 0.01 to 5%.

Y is an element which has a high tendency to form a liquid two-phase separation system by containing Al. Particularly, when a liquid two-phase separation system Al alloy which contains Sn, Bi, and In is used as a more stable liquid two-phase separation system, it is easier to melt the alloy.

When Y is contained, two-liquid phase separation becomes stable and the melting temperature for the alloy production is reduced. This makes a fine dispersion of the Al crystal grain in the metal matrix easy.

Further, the content of Y is within the range of 60% even when a plurality of elements are contained. When the content of Y is less than 0.01%, there are demerits such that the two-liquid phase separation is unstable. When the content of Y exceeds 60%, the amount of Al is reduced. This provides demerits such that the generation of hydrogen gas is decreased. Particularly, it is preferably in the range of 0.1 to 30%. This provides merits such that the production of the alloy becomes easier. Further, Mn, Zn, Mg, and Ga are particularly preferable as Y. Mn, Zn, and Mg are additive elements of mass-produced aluminum cans. Even if the aluminum cans are melted, hydrogen may be generated. Since the two-liquid phase separation temperature is rapidly decreased by adding Ga, the dissolution of the alloy becomes easier and the hydrogen gas yield becomes larger.

Further, the relation of X and Y is defined by 2X>Y. When the alloy is produced so that the total of X and Y is in the range of 10.1 to 99.5%, an effect such that a fine crystal grain of Al is dispersed in an X-Y matrix is exerted. Further, when the hydrogen gas generating member contains X, Y, unavoidable impurities, and the balance being Al, the total mass percentage is 100%.

Further, the hydrogen gas generating member of the present invention is rolled and processed. A rolling apparatus may be any one of a two-high rolling mill, a Sendzimir rolling mill, a planetary rolling mill, and a universal rolling mill. The rolling ratio is preferably in the range of 30 to 99.99%.

The Al crystal grain which is originally fine and has a very high purity in the metal matrix is stretched into a fiber shape through the rolling process. Further, when a large number of fine cracks are formed in the crystal grain, an area coming in contact with water is increased and the reactivity with water may be improved. Further, when the fiber-shaped Al grain is reacted with water, voids are formed in a plate material. When water further permeates into the voids, the whole Al in the metal matrix is reacted with water and thus the hydrogen generating efficiency may be increased.

Further, the hydrogen gas generating member of the present invention is powdered. The powdering may be performed by mechanical grinding processes such as the ball mill grinding process or the attritor grinding process, or, alternatively, the process for powdering from a melted state using, for example, an atomizer. When the hydrogen gas generating member is prepared to have a small particle diameter and further the Al crystal grain is made to be present on the surface, the contact surface with water may be increased and the hydrogen generating efficiency may be increased. At this time, the weight average particle diameter of the hydrogen gas generating member is in the range of 5 to 400 µm. When the weight average particle diameter is less than 5 µm, the surface oxide film of Al is increased. This provides demerits such that the generation of hydrogen is inhibited. When the weight average particle diameter exceeds 400 µm, the dispersed particle diameter of Al becomes larger, which is disadvantageous. Particularly, it is preferably in the range of 20 to 100 µm. This provides merits such that a balance between the dispersed particle diameter of Al and hydrogen generating efficiency is good.

Figure 1:
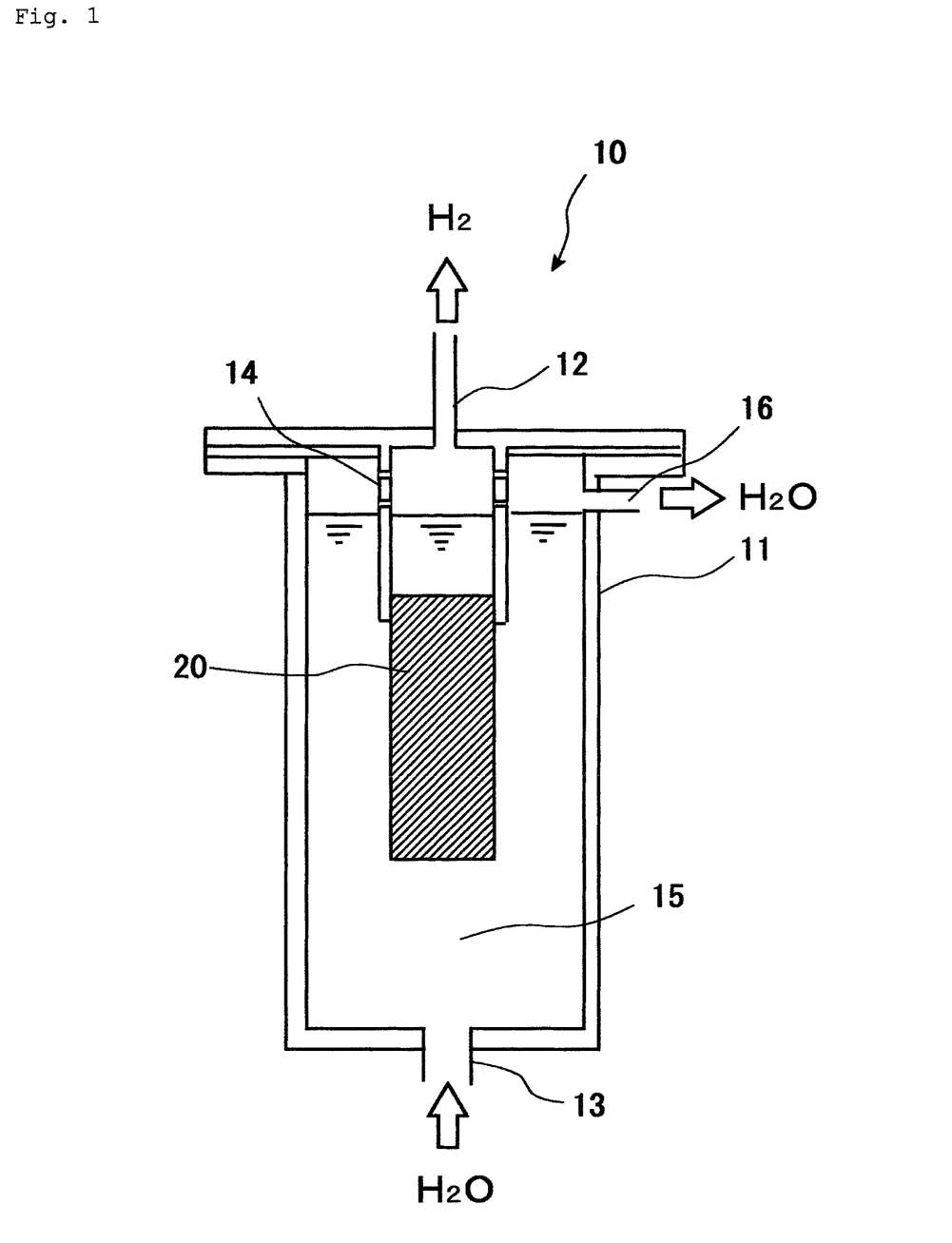
FIG. 1 is a schematic diagram showing a structure of a hydrogen gas generating apparatus which generates hydrogen gas.

Further, the process for producing hydrogen gas of the present invention will be described. FIG. 1 is a schematic diagram showing a structure of a hydrogen gas generating apparatus which generates hydrogen gas.

As shown in FIG. 1, a water supply pipe 13 that supplies water and a hydrogen gas collecting pipe 12 that takes the generated hydrogen gas outside to store it are formed in a hydrogen generating apparatus 10. Further, a fixing member 14 for mounting a hydrogen gas generating member 20 is provided in the hydrogen generating apparatus 10 and is brought into contact with a water 15 that is stored inside. Water is supplied from the water supply pipe 13 to the hydrogen generating apparatus 10 and is brought into contact with the hydrogen gas generating member 20. The hydrogen gas generated from the surface is supplied outside through the hydrogen gas collecting pipe 12 and stored in a storage tank (not shown). As shown in FIG. 1, the fixing member 14 not only fixes the hydrogen gas generating member 20 but also may control the hydrogen gas yield when the fixing member 14 is made to be movable up and down and the contact area of the hydrogen gas generating member 20 with water is adjusted. Further, a plurality of the fixed members 14 may be provided and the details will not be described here. The use of the hydrogen generating apparatus 10 having the hydrogen gas generating member 20 allow for easy production of hydrogen gas.

Subsequently, the hydrogen gas generating member of the present invention will be more specifically described.

EXAMPLE 1

A process of the rolling treatment of an Al—X—Y alloy of the hydrogen gas generating member will be described.

An alloying treatment is performed by first putting Al and Sn as a dopant metal X into the same crucible, melting in a high-frequency melting furnace, and casting to a template. As for the melting method, any of known techniques such as a heating technique using an electric furnace may be used.

The casted Al alloy is subjected to the rolling treatment by rolling. Known materials such as kerosene may be used as lubricants. Further, either hot-rolling or cold-rolling techniques may be used. From a cost viewpoint, the rolling treatment by cold-rolling is preferable.

Figure 2:
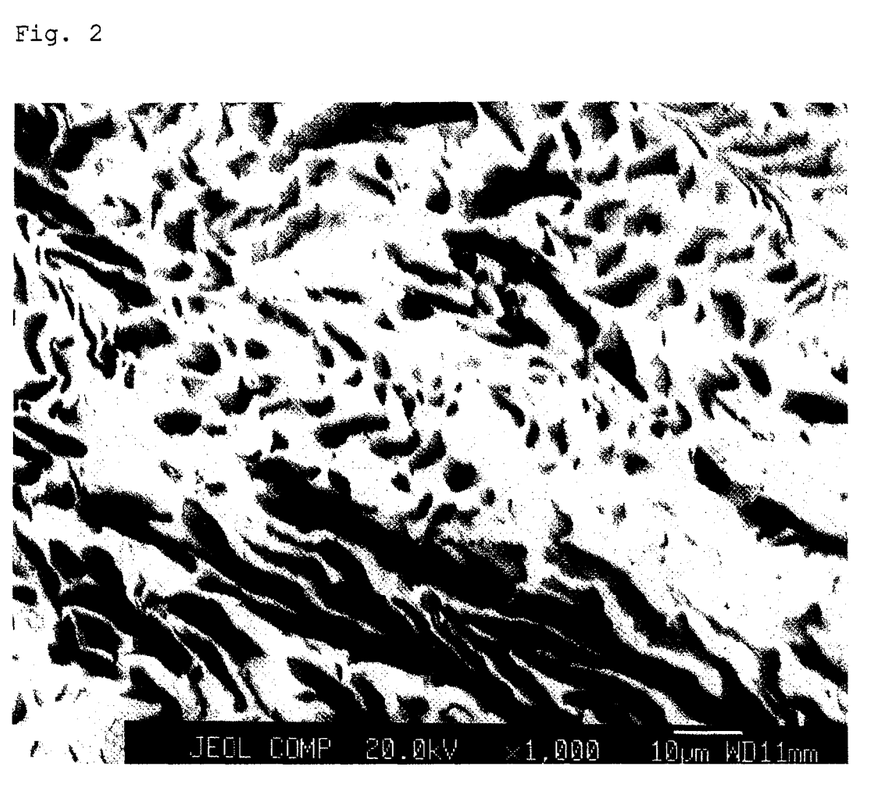
FIG. 2 is an SEM photograph showing the cross section of the hydrogen gas generating member containing Al and Sn.

FIG. 2 is an SEM photograph showing the cross section of the hydrogen gas generating member containing Al and Sn. Al and Sn were cast into a cylindrical template with a diameter of 20 mm after the high-frequency melting. In the SEM photograph, a white base matrix is Sn and a black point is Al. The whole composition analysis was carried out by EPMA. As the result, Al was 30% and Sn was 70%. The specimen was cut out and rolled with a cold rolling mill. The rolling could be easily performed and a hydrogen gas generating member having a rolling ratio of 99.99% could be obtained.

The rolled surface of the obtained sample was analyzed XPS (X-ray photoelectron spectroscopy). As the result, it was found that an oxide of Al and an oxide of Sn were present together on the very outermost surface of the rolled sample.

0.0515 g of hydrogen gas generating member (a thin film) was immersed in water at 15° C. When about 60 seconds passed after the immersion, hydrogen was vigorously generated.

With the expansion of the specimen, a situation where the generation of hydrogen was proceeding from the inside of the specimen was observed. When the generation of hydrogen was finally finished, the shape at the time of rolling of the specimen was not kept. At this time, the hydrogen gas yield was about 6 mL. When the hydrogen gas yield was theoretically, considered, the efficiency was about 90%.

The composition at this time as well as the situation of the generation of hydrogen gas are shown in Table 1. The generation of hydrogen gas was visually evaluated. The case where hydrogen was vigorously generated was defined as "Very good", the case where hydrogen was sufficiently generated in a state in which there was no problem practically was defined as "Good", and the case where hydrogen was not generated or the hydrogen generation level was not enough even if it was generated was defined as "Bad".

EXAMPLES 2 to 19

Al—X—Y alloys of Examples 2 to 19 were subjected to rolling treatment in the same manner as described in Example 1 except that the type and amount of the dopant metal as to X and Y were changed. The composition at this time as well as the situation of the generation of hydrogen gas are additionally shown in Table 1.

COMPARATIVE EXAMPLE 1

A pure Al was cast into the cylindrical template with a diameter of 20 mm after the high-frequency melting. The specimen was cut out and rolled with the cold rolling mill. A specimen with a rolling ratio of 99.99% was prepared. The specimen was analyzed by XPS. As the result, an oxide of Al was confirmed on the very outermost surface of the sample. Further, the same specimen was brought into contact with water at ordinary temperature. Nothing was generated from the plate material. The results are shown in Table 1.

COMPARATIVE EXAMPLES 2 to 34

Alloys of Comparative examples 2 to 4 to which Sn, Bi, and In were added and alloys of Comparative examples 5 to 11 to which Fe, Zn, Ga, Ge, Hg, Pb, and Si were added were subjected to rolling treatment in the same manner as described in Example 1 except that the type and amount of the dopant metal as to X and Y were changed. The composition at this time as well as the situation of the generation of hydrogen gas are shown in Table 1. Nothing was generated from plate materials of Sn, Bi, and In and other alloys. The results are shown in Table 1.

The results of XPS of Example 1 and Comparative example 1, it was found that the presence of an oxide of an additive element on the very outermost surface of the sample was important as an initial stage of hydrogen generation. When water penetrates into an interface between the oxide of Al and the oxide of the additive element, hydrogen is generated by reaction with the pure Al therein.

At this time, the additive element for alloying to Al, the rolling ratio, and the generation of hydrogen were examined. The result is shown in Table 1 including the results of Examples 1 to 34 and Comparative examples 1 to 11.

TABLE 1

Dopant materials to Al-alloy, the rolling ratio, and the generation of hydrogen

| Example Comparative Example | X (mass percent) | Y (mass percent) | Rolling ratio (percent) | Water temperature (° C.) | Generation of hydrogen |
|---|---|---|---|---|---|
| Example 1 | Sn: 70 | — | 99.99 | 15 | Very good |
| Example 2 | Sn: 50 | Pb: 0.01 | 80 | 50 | Very good |
| Example 3 | Sn: 95 | — | 85 | 20 | Very good |
| Example 4 | Sn: 90 | — | 50 | 50 | Very good |
| Example 5 | Sn: 80 | — | 80 | 20 | Very good |
| Example 6 | Sn: 70 | — | 95 | 30 | Very good |
| Example 7 | Sn: 60 | — | 97 | 15 | Very good |
| Example 8 | Sn: 40 | — | 98 | 50 | Very good |
| Example 9 | Sn: 30 | — | 98 | 90 | Very good |
| Example 10 | Sn: 20 | — | 99 | 70 | Very good |
| Example 11 | Sn: 5 | — | 99 | 50 | Good |
| Example 12 | Sn: 20 | Si: 20 | 15 | 90 | Good |
| Example 13 | Bi: 90 | — | 10 | 50 | Very good |
| Example 15 | Bi: 50 | — | 10 | 20 | Very good |
| Example 16 | Bi: 20 | — | 50 | 90 | Good |
| Example 17 | Bi: 50 | Cd: 10 | 30 | 30 | Very good |
| Example 18 | Bi: 30.1 | Cu: 0.2 | 30 | 90 | Good |
| Example 19 | In: 90 | — | 90 | 15 | Very good |
| Example 20 | In: 30 | — | 90 | 15 | Very good |
| Example 21 | Sn: 48, Bi: 20 | — | 95 | 35 | Very good |
| Example 22 | Sn: 48, Bi: 20 | Fe: 3 | 85 | 15 | Very good |
| Example 23 | Sn: 57, Bi: 5 | Zn: 0.3 | 95 | 70 | Very good |
| Example 24 | Sn: 48, Bi: 20 | Ga: 1 | 80 | 90 | Very good |
| Example 25 | Sn: 16, Bi: 20 | Ge: 25 | 40 | 30 | Good |
| Example 26 | Sn: 19, Bi: 5 | Hg: 0.2 | 90 | 90 | Good |
| Example 27 | Sn: 47.5, Bi: 5 | Mg: 10 | 99 | 60 | Good |
| Example 28 | Sn: 40, In: 40 | — | 90 | 15 | Very good |
| Example 29 | Sn: 40, In: 40 | Ni: 0.1 | 90 | 15 | Very good |
| Example 30 | Sn: 50, In: 5 | S: 0.01 | 99 | 60 | Very good |
| Example 31 | Sn: 3, Bi: 7, In: 10 | Mn: 1 | 50 | 50 | Very good |
| Example 32 | Sn: 6, Bi: 14, In: 20 | — | 15 | 90 | Very good |
| Example 33 | Sn: 4, In: 5, Bi: 11 | — | 80 | 15 | Very good |
| Example 34 | Sn: 7, In: 10, Bi: 22 | — | 30 | 90 | Very good |
| Comparative Example 1 | — | — | 99.99 | 90 | Bad |
| Comparative Example 2 | Sn: 0.01 | — | 99.99 | 80 | Bad |
| Comparative Example 3 | Bi: 0.01 | — | 99.99 | 90 | Bad |
| Comparative Example 4 | In: 0.01 | — | 99.99 | 70 | Bad |
| Comparative Example 5 | — | Fe: 4 | 70 | 80 | Bad |
| Comparative Example 6 | — | Zn: 3 | 99 | 80 | Bad |
| Comparative Example 7 | — | Ga: 15 | 70 | 80 | Bad |
| Comparative Example 8 | — | Ge: 10 | 95 | 80 | Bad |
| Comparative Example 9 | — | Hg: 5 | 50 | 80 | Bad |
| Comparative Example 10 | — | Pb: 10 | 95 | 90 | Bad |
| Comparative Example 11 | — | Si: 10 | 40 | 80 | Bad |

As is apparent from Table 1, it was found that hydrogen gas could be generated by adding Sn, Bi, and In as additive elements to Al. Further, the hydrogen generating efficiency was higher as the rolling ratio was higher.

EXAMPLE 35

A process of powdering the Al—X—Y alloy of the hydrogen gas generating member of the present invention will be described.

First, the Al—X—Y alloy is put into the same crucible and is melted in the high-frequency melting furnace, and then it is formed into powder using powder forming techniques such as the gas atomizing method. As for the melting method, any of known techniques such as a heating technique using an electric melting furnace may be used.

The Al—X—Y alloy was formed into powder by the gas atomizing method after the high-frequency melting. The composition of the produced powder is shown in Table 2.

Figure 3:
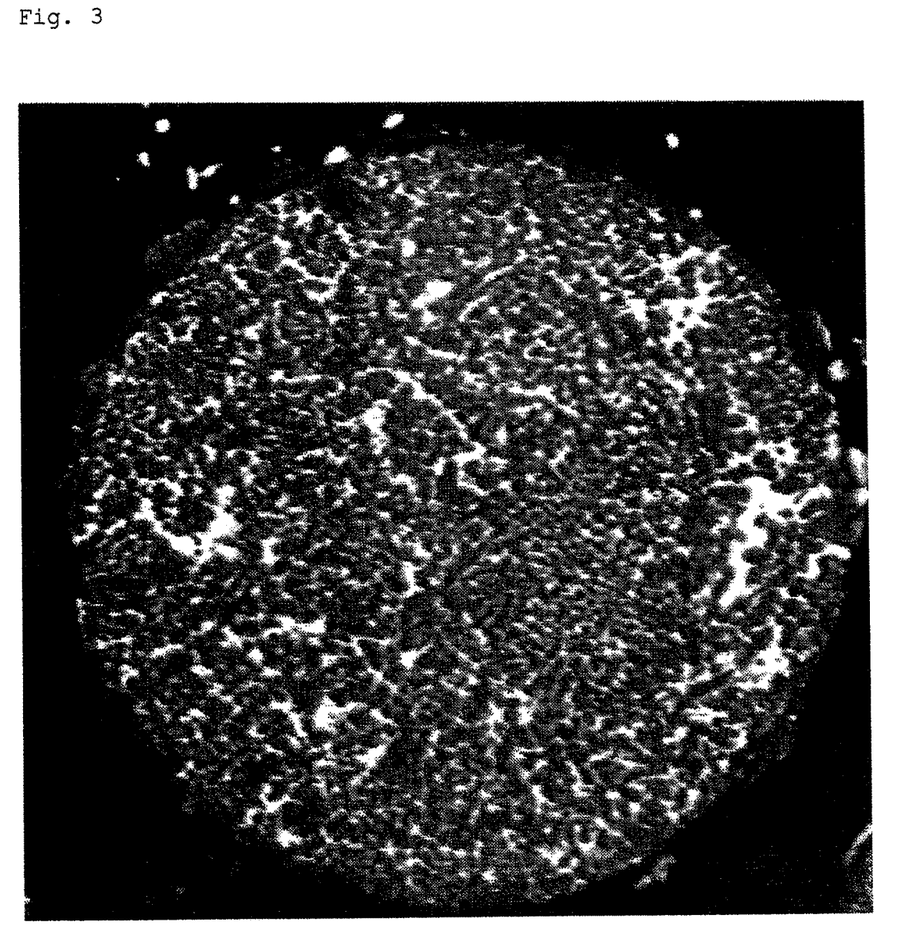

FIG. 3 is an SEM photograph showing the cross section of the hydrogen gas generating member containing Al, Sn, and In. A white base matrix is Sn-In and a black point is Al. The whole composition analysis was carried out by EPMA. As the result, Al was 60% and Sn-In alloy was 40%.

Figure 4:
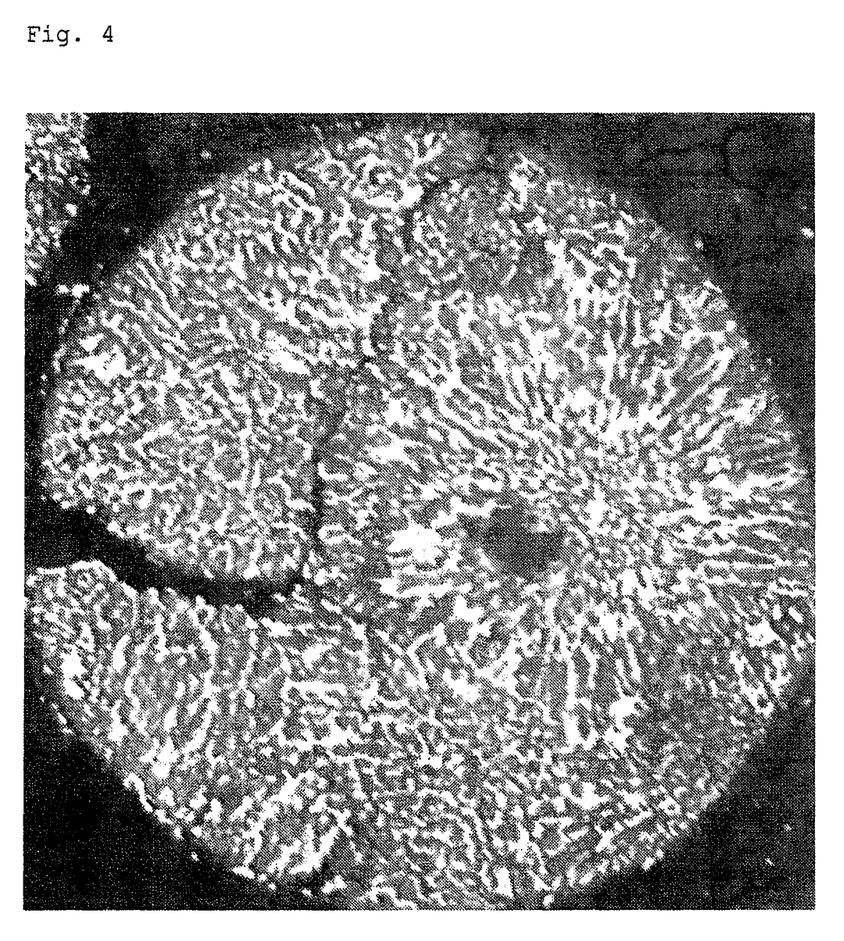
FIG. 4 is an SEM photograph of the cross-sectional texture of the hydrogen gas generating member containing Al, Sn, and In when hydrogen is generated.

5 g of the powder was taken out and stored in a stainless steel mesh, followed by bringing into contact with warm water at 60° C. The water discolored while hydrogen was vigorously generated immediately after the immersion. An SEM photograph the cross-sectional texture of the test powder at the time is shown in FIG. 4. A crack entered from the surface and extended to the inside of Al. In this case, the active surface of Al was exposed. It is considered that hydrogen was generated by the hydration reaction of hydroxide formation with water. The composition at this time as well as the situation of the generation of hydrogen gas are shown in Table 2.

EXAMPLES 36 to 53

Al—X—Y alloys of Examples 36 to 53 were subjected to powdering treatment in the same manner as described in Example 35 except that the type and amount of the dopant metal as to X and Y were changed. The composition at this time as well as the situation of the generation of hydrogen gas are additionally shown in Table 2.

COMPARATIVE EXAMPLES 12 to 18

Al—X—Y alloys of Comparative examples 12 to 18 were subjected to powdering treatment in the same manner as described in Example 35 except that the type and amount of the dopant metal as to X and Y were changed. The composition at this time as well as the situation of the generation of hydrogen gas are additionally shown in Table 2. 5 g of the powder was taken out, followed by bringing into contact with warm water. No change occurred after the immersion and the generation of hydrogen was not observed.

At this time, the additive element for alloying to Al, the particle diameter, and the generation of hydrogen were examined. The result is shown in Table 2 including the results of Examples 35 to 53 and Comparative examples 12 to 18.

TABLE 2

Dopant materials to Al-alloy, the particle diameter, and the generation of hydrogen

| Example Comparative Example | X (mass percent) | Y (mass percent) | Particle diameter of powder (μm) | Water temperature (° C.) | Generation of hydrogen |
|---|---|---|---|---|---|
| Example 35 | Sn: 30, In: 10 | — | 200-250 | 60 | Very good |
| Example 36 | Sn: 90 | — | 10-50 | 90 | Very good |
| Example 37 | Sn: 40 | Pb: 0.01 | 50-200 | 70 | Very good |
| Example 38 | Sn: 20 | Si: 20 | 10-250 | 90 | Good |
| Example 39 | Bi: 99.9 | — | 5-100 | 50 | Good |
| Example 40 | Bi: 50 | Cd: 10 | 100-300 | 30 | Very good |
| Example 41 | Bi: 30.1 | Cu: 0.2 | 200-250 | 90 | Good |
| Example 42 | In: 90 | — | 10-100 | 15 | Very good |
| Example 43 | Sn: 30, Bi: 5 | Fe: 3 | 10-150 | 50 | Very good |
| Example 44 | Sn: 40, Bi: 5 | Zn: 3 | 50-150 | 70 | Very good |
| Example 45 | Sn: 48, Bi: 20 | Ga: 1 | 10-250 | 90 | Very good |
| Example 46 | Sn: 36, Bi: 20 | Ge: 25 | 50-200 | 30 | Good |
| Example 47 | Sn: 19, Bi: 5 | Hg: 0.2 | 10-250 | 90 | Good |
| Example 48 | Sn: 47.5, Bi: 5 | Mg: 10 | 5-100 | 60 | Good |
| Example 49 | Sn: 15, In: 5 | Ni: 0.1 | 100-300 | 90 | Very good |
| Example 50 | Sn: 13, Bi: 7, In: 30 | S: 0.01 | 10-100 | 50 | Very good |
| Example 51 | Sn: 22, Bi: 4, In: 35 | Mn: 0.2 | 10-150 | 90 | Very good |
| Example 52 | Sn: 37, In: 5, Bi: 30 | — | 200-250 | 15 | Very good |
| Example 53 | Sn: 7, In: 10, Bi: 22 | — | 10-100 | 90 | Very good |
| Comparative Example 12 | — | Cu: 50 | 30-400 | 90 | Bad |
| Comparative Example 13 | Sn: 0.01 | — | 10-100 | 80 | Bad |
| Comparative Example 14 | Bn: 0.01 | — | 50-300 | 90 | Bad |
| Comparative Example 15 | In: 0.01 | — | 30-400 | 70 | Bad |
| Comparative Example 16 | — | Fe: 4 | 200-250 | 80 | Bad |
| Comparative Example 17 | — | Pb: 20 | 5-100 | 80 | Bad |
| Comparative Example 18 | — | Ga: 15 | 50-100 | 80 | Bad |

As is apparent from Table 2, Sn, In, and Bi were good as additive elements for alloying to Al. Further, the hydrogen generating efficiency was higher as the particle diameter was smaller.

A lot of applications such as portable batteries and emergency electrical generators are considered using the hydrogen gas generating member and the process for producing hydrogen gas to be obtained by the present invention. Further, it is a safe material as science teaching material to understand the mechanism of water.

The invention claimed is:

1. A hydrogen gas generating member comprising:
an Al—X alloy which comprises a matrix and Al dispersed in the matrix, wherein
X is Sn: 60 to 99.5% by mass, Bi: 30.1 to 99.5% by mass, In: 10.1 to 99.5% by mass, Sn+Bi: 20.1 to 99.5% by mass, Sn+In: 80 to 99.5% by mass, Bi+In: 20.1 to 99.5% by mass, or Sn+Bi+In: 20 to 99.5% by mass,
the Al—X alloy is separated into a first solid phase of Al crystal grains and a second solid phase of crystal grains of the matrix,
a number average domain diameter of the Al crystal grains is 0.01 to 500 μm, and
hydrogen gas is generated by bringing the hydrogen gas generating member into contact with water.

2. The hydrogen gas generating member according to claim 1, wherein the Al—X alloy is an Al—X—Y alloy that further comprises Y, and
Y is Pb: 0.01 to 20% by mass, Zn: 0.01 to 30% by mass, Si: 0.01 to 20% by mass, Cd:0.01 to 20% by mass, Cu: 0.01 to 20% by mass, Fe: 0.01 to 5% by mass, Ga: 0.01 to 30% by mass, Ge: 0.01 to 30% by mass, Hg: 0.01 to 20% by mass, Mg: 0.01 to 20% by mass, Ni: 0.01 to 5% by mass, S: 0.01 to 5% by mass, or Mn: 0.01 to 5% by mass, the total content of Y is lower than 60% by weight even when a plurality of Y elements is contained in the alloy, and the content of X by weight is larger than half of the total content of Y by weight.

3. The hydrogen gas generating member according to claim 1, wherein the hydrogen gas generating member comprises a plate having a rolling ratio of 30 to 99.99 %.

4. The hydrogen gas generating member according to claim 1, wherein the hydrogen gas generating member comprises powders having a weight average particle diameter of 5 to 400 μm.

5. The hydrogen gas generating member according to claim 2, wherein the hydrogen gas generating member comprises a plate having a rolling ratio of 30 to 99.99 %.

6. The hydrogen gas generating member according to claim 2, wherein the hydrogen gas generating member comprises powders having a weight average particle diameter of 5 400 μm.

\* \* \* \* \*